(12) United States Patent
Bowers et al.

(10) Patent No.: US 11,392,413 B2
(45) Date of Patent: *Jul. 19, 2022

(54) PROVISION OF COMPUTER RESOURCES BASED ON LOCATION HISTORY

(71) Applicant: Google LLC, Mountain View, CA (US)

(72) Inventors: Andrew Bowers, San Francisco, CA (US); Kevin Tom, San Francisco, CA (US); Amy Han, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 670 days.

This patent is subject to a terminal disclaimer.

(21) Appl. No.: 16/122,487

(22) Filed: Sep. 5, 2018

(65) Prior Publication Data

US 2019/0004859 A1    Jan. 3, 2019

Related U.S. Application Data

(63) Continuation of application No. 14/453,821, filed on Aug. 7, 2014, which is a continuation of application No. 13/072,238, filed on Mar. 25, 2011, now Pat. No. 8,832,003.

(51) Int. Cl.
  *G06N 20/00* (2019.01)
  *H04W 64/00* (2009.01)
  *G06F 9/50* (2006.01)

(52) U.S. Cl.
  CPC ............. *G06F 9/5011* (2013.01); *G06F 9/50* (2013.01); *G06N 20/00* (2019.01); *H04W 64/00* (2013.01); *G06F 2209/5019* (2013.01)

(58) Field of Classification Search
  CPC .. G06F 9/5011; G06F 9/20; G06F 2209/5019; G06N 20/00; H04W 64/00

USPC .......................................................... 706/54
  See application file for complete search history.

(56) References Cited

U.S. PATENT DOCUMENTS

| | | | | |
|---|---|---|---|---|
| 6,125,278 A | * | 9/2000 | Wieczorek | ............ H04W 28/26 455/437 |
| 7,606,580 B2 | * | 10/2009 | Granito | .................. G01C 21/00 455/456.1 |
| 7,831,679 B2 | * | 11/2010 | Apacible | ................. G06F 15/16 709/209 |
| 7,945,271 B1 | | 5/2011 | Barnes et al. | |
| 8,326,793 B1 | | 12/2012 | Bowers et al. | |
| 8,768,867 B1 | | 7/2014 | Thaeler et al. | |

(Continued)

OTHER PUBLICATIONS

Final Office Action from U.S. Appl. No. 14/453,821, dated Oct. 4, 2018, 27 pp.

(Continued)

*Primary Examiner* — Omar F Fernandez Rivas
*Assistant Examiner* — Shamcy Alghazzy
(74) *Attorney, Agent, or Firm* — Shumaker & Sieffert, P.A.

(57) ABSTRACT

A location history manager may be configured to determine a location history associated with a user, and a resource usage manager may be configured to determine a computing resource usage history associated with the user. A location monitor may be configured to determine a location of the user. A resource predictor may be configured to generate a prediction of a computing resource, based on the location history, the computing resource usage history, and the location. A resource provider may be configured to provide the computing resource, based on the prediction.

20 Claims, 5 Drawing Sheets

(56) References Cited

U.S. PATENT DOCUMENTS

| | | | |
|---|---|---|---|
| 8,832,003 | B1 | 9/2014 | Bowers et al. |
| 9,449,282 | B2* | 9/2016 | Diaz .................. G06F 16/9535 |
| 2003/0182394 | A1* | 9/2003 | Ryngler ................ H04W 4/029 |
| | | | 709/217 |
| 2004/0085909 | A1 | 5/2004 | Soliman |
| 2005/0060250 | A1* | 3/2005 | Heller .................... G06Q 30/04 |
| | | | 705/34 |
| 2006/0010206 | A1 | 1/2006 | Apacible et al. |
| 2006/0156209 | A1* | 7/2006 | Matsuura .......... H04M 1/72472 |
| | | | 714/798 |
| 2007/0162473 | A1 | 7/2007 | Hadzikadic et al. |
| 2007/0299796 | A1 | 12/2007 | Macbeth et al. |
| 2009/0005964 | A1* | 1/2009 | Forstall .............. G01C 21/3492 |
| | | | 701/533 |
| 2009/0233623 | A1 | 9/2009 | Johnson |
| 2009/0265423 | A1* | 10/2009 | Mahajan ............... G06F 9/5055 |
| | | | 709/203 |
| 2010/0159898 | A1* | 6/2010 | Krzyzanowski ..... G01D 11/245 |
| | | | 455/414.1 |
| 2010/0223563 | A1* | 9/2010 | Green .................... G06F 3/0484 |
| | | | 715/762 |
| 2010/0262467 | A1 | 10/2010 | Barnhill, Jr. et al. |
| 2011/0028138 | A1* | 2/2011 | Davies-Moore .... G06F 3/04817 |
| | | | 455/418 |
| 2011/0126119 | A1 | 5/2011 | Young et al. |
| 2011/0208425 | A1* | 8/2011 | Zheng .................... G01S 19/14 |
| | | | 701/532 |
| 2011/0230201 | A1 | 9/2011 | Hotes et al. |
| 2011/0250875 | A1* | 10/2011 | Huang .................... H04W 4/38 |
| | | | 455/418 |
| 2012/0028650 | A1 | 2/2012 | Cooper et al. |
| 2012/0032945 | A1 | 2/2012 | Dare et al. |
| 2012/0058782 | A1 | 3/2012 | Li |

OTHER PUBLICATIONS

Amendment in Response to Office Action dated Oct. 4, 2018, from U.S. Appl. No. 14/453,821, filed Jan. 2, 2019, 13 pp.

Notice of Appeal for U.S. Appl. No. 14/453,821, filed Jan. 3, 2020, 1 pp.

Appeal Brief from U.S. Appl. No. 14/453,821, dated Mar. 3, 2020, 29 pp.

Advisory Action from U.S. Appl. No. 14/453,821, dated Jan. 3, 2020, 3 pp.

Examiner's Answer from U.S. Appl. No. 14/453,821, dated Jul. 10, 2020, 14 pp.

Chan, Jonathan et al., "Integrating Mobility Prediction and Resource Pre-allocation into a Home-Proxy Based Wireless Internet Framework," IEEE, Sep. 5-8, 2000, pp. 18-23.

Park, Moon-Hee et al.; "Location-Based recommendation System Using Bayesian User's Preference Model in Mobil Devices"; 2007; Springer; pp. 1130-1139. Applicant points out, in accordance with MPEP 609.04(a), that the year of publication, 2007, is sufficiently earlier than the effective U.S. filing date, 2011, so that the particular month of publication is not in issue.

Prasad, Pratap S. et al., "Mobility Prediction for Wireless network Resource Management," Mar. 15-17, 2009; IEEE; 41st Southeastern Symposium on System Theory; pp. 98-102.

Prosecution History from U.S. Appl. No. 13/072,238, from Nov. 1, 2011 through May 7, 2014, 18 pp.

Prosecution History from U.S. Appl. No. 13/246,795, from Apr. 5, 2012 through Aug. 7, 2012, 35 pp.

Tabassum, Kahkashan et al., "A data mining approach for Cache Replacement in Location-dependent Environment," May 7-10, 2010; IEEE; Second International Conference on Computer Research and Development; pp. 126-130.

Tseng, Vincent S. et al., "Efficient mining and prediction of user behavior patterns in mobile web systems," Jan. 23, 2006; Elsevier, Information and Software Technology 48; pp. 357-369.

U.S. Appl. No. 13/072,238, filed Mar. 25, 2011, by Bowers et al.

U.S. Appl. No. 13/246,795, by Andrew Bowers, filed Sep. 27, 2011.

U.S. Appl. No. 13/668,729, by Andrew Bowers, filed Nov. 5, 2012.

Yavas, Gokhan et al., "A data mining approach for location prediction in mobile environments," Aug. 2005; Elsevier, Data & Knowledge Engineering 54; pp. 121-146.

Prosecution History from U.S. Appl. No. 14/453,821, from Oct. 8, 2014 through Jun. 7, 2018, 74 pp.

U.S. Appl. No. 14/453,821, filed Aug. 7, 2014, by Bowers et al.

Final Office Action from U.S. Appl. No. 14/453,821, dated Oct. 3, 2019, 19 pp.

Amendment in Response to Office Action dated Oct. 3, 2019, from U.S. Appl. No. 14/453,821, filed Nov. 25, 2019, 17 pp.

Decision on Appeal from U.S. Appl. No. 14/453,821, dated May 23, 2022, 7 pp.

\* cited by examiner

| Location Characteristic 1 (402) | Location Characteristic 2 (404) | Location Characteristic 3 (406) | Should Provide (408) | Should NOT provide (410) | Action (412) |
|---|---|---|---|---|---|
| A | C | | 2 | 0 | Provide |
| A | D | | 0 | 3 | Don't Provide |
| B | C | | 2 | 2 | ? |
| B | D | | 1 | 0 | Provide |

FIG. 4A

Provide BC characteristics

| | Should Provide (414) | Should NOT Provide (416) |
|---|---|---|
| Action Provide | 3 | 2 |
| Action Don't provide | 1 | 4 |

FIG. 4B

Don't provide BC characteristics

| | Should Provide (418) | Should NOT Provide (420) |
|---|---|---|
| Action Provide | 3 | 1 |
| Action Don't provide | 2 | 4 |

FIG. 4C

PROVISION OF COMPUTER RESOURCES BASED ON LOCATION HISTORY

CROSS REFERENCE TO RELATED APPLICATIONS

This application is a continuation of U.S. application Ser. No. 14/453,821, filed on Aug. 7, 2014, which is a continuation of, and claims priority under 35 U.S.C. § 120 to, U.S. application Ser. No. 13/072,238, filed on Mar. 25, 2011, and titled "PROVISION OF COMPUTER RESOURCES BASED ON LOCATION HISTORY," the entire contents of which are hereby incorporated by reference.

TECHNICAL FIELD

This description relates to provision of computer resources.

BACKGROUND

Consumers and other users of computer resources often wish to utilize such computer resources in a fast, convenient, and efficient manner. For example, such users may wish to utilize computer resources in a manner that requires a minimal amount of time and/or effort. In other examples, such users may appreciate being made aware of possibilities for utilizing computer resources in a manner which would otherwise have been unknown or not considered.

In practice, however, many users are likely to utilize computer resources in manners which are repetitive, inconvenient, or otherwise inefficient. For example, an employee may spend a certain amount of time every morning opening the same or similar applications. In another example, a user making travel arrangements may be unaware of, and therefore may not consider, various resources which may be available to enhance an enjoyment or productivity of the user during the trip.

Any number of techniques exist for providing users with suggestions, automations of tasks, and other intended optimizations which are designed to enhance a user's experience(s) of one or more computing resources. However, such conventional techniques may provide too many or too few of their intended optimizations to be of practical use. Further, such conventional techniques may not be sufficiently accurate, and, in particular, may not consider or properly utilize certain types of information associated with each user which may be instrumental in providing useful, accurate optimizations when attempting to provide users with efficient uses of computer resources. Consequently, users may not experience a full benefit of such computer resources.

SUMMARY

According to one general aspect, a computer system may include instructions stored on a computer-readable medium and executable by at least one processor. The computer system may include a location history manager configured to cause the at least one processor to determine a location history associated with a user. The computer system may include a resource usage manager configured to cause the at least one processor to determine a computing resource usage history associated with the user, and a location monitor configured to cause the at least one processor to determine a location of the user. The computer system also may include a resource predictor configured to cause the at least one processor to generate a prediction of a computing resource, based on the location history, the computing resource usage history, and the location, and a resource provider configured to cause the at least one processor to provide the computing resource, based on the prediction.

According to another general aspect, a computer-implemented method may include executing instructions stored on a computer-readable medium. The method may include determining a location history associated with a user, determining a computing resource usage history associated with the user, and determining a location of the user. The method may further include generating a prediction of a computing resource, based on the location history, the computing resource usage history, and the location, and providing the computing resource, based on the prediction.

According to another general aspect, a computer program product may be tangibly embodied on a computer-readable medium and may include executable code that, when executed, is configured to cause a data processing apparatus to determine a location history associated with a user, determine a computing resource usage history associated with the user, and determine a location of the user. The executable code, when executed, may be further configured to cause the data processing apparatus to generate a prediction of a computing resource, based on the location history, the computing resource usage history, and the location, and provide the computing resource, based on the prediction.

The details of one or more implementations are set forth in the accompanying drawings and the description below. Other features will be apparent from the description and drawings, and from the claims.

BRIEF DESCRIPTION OF THE DRAWINGS

FIGS. 4A-4C are tables illustrating example data structures that may be used in executing the machine learning algorithm of FIG. 3.

DETAILED DESCRIPTION

Figure 1:
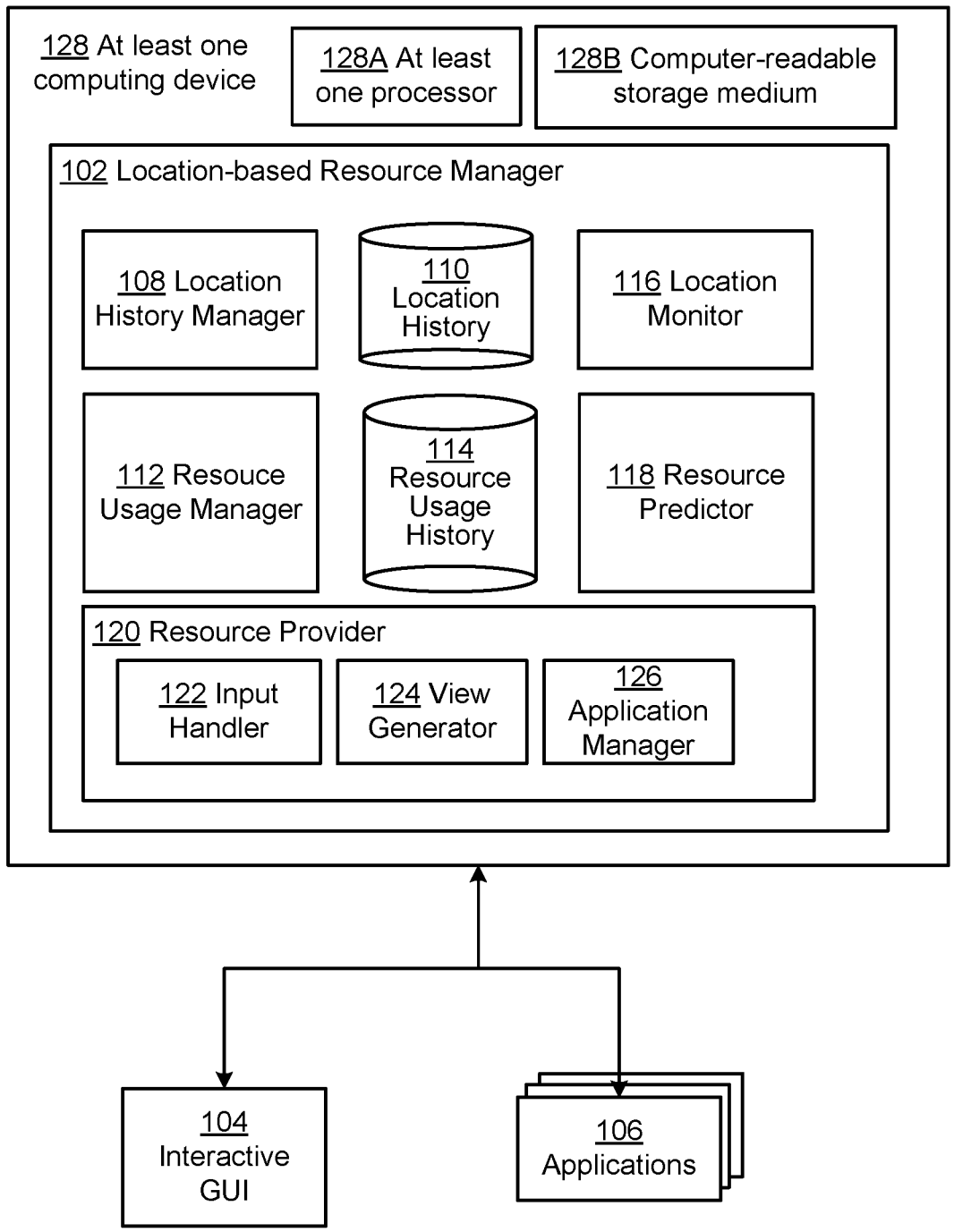
FIG. 1 is a block diagram of a system for providing computer resources to a user based on a location history associated with the user.

FIG. 1 is a block diagram of a system 100 for providing computer resources to a user based on a location history associated with the user. In the example of FIG. 1, the system 100 may include a location-based resource manager 102 which may be configured to track or otherwise determine a location history and other usage patterns associated with a user of the system 100, and to thereafter utilize such information to predict a current or future use of one or more computer resources by the user. In this way, the user may be provided with fast, convenient, efficient access to appropriate computer resources, so as to thereby increase an enjoyment and/or productivity of the user with respect to the computer resources.

In the example of FIG. 1, the system 100 may include, and/or may communicate with, an interactive graphical user interface (GUI) 104, which may be accessed by the user of the system 100, e.g., to configure, update, maintain, or otherwise interact with the location-based resource manager 102. For example, the user may utilize the interactive GUI 104 in order to input location information associated with the user and/or other data which may be useful to the location-based resource manager 102 in predicting and otherwise providing computer resources to the user.

In some implementations, the location-based resource manager 102 may proactively and specifically request information from the user by way of the interactive GUI 104. Additionally, or alternatively, the user may utilize the interactive GUI 104 to specify specific types of information, or values thereof, which the user wishes the location-based resource manager 102 to utilize in predicting or otherwise providing computer resources.

Further, the interactive GUI 104 may be used by the location-based resource manager 102 to provide the user with suggested computer resources, as well as to provide the user with an opportunity to accept, reject, or modify the suggested implementations or other uses of computer resources. Still further, the interactive GUI 104 may itself be used to provide the suggested/predicted computer resources to the user. For example, the interactive GUI 104 may be utilized to provide links to computer resources, or to directly provide information or otherwise enable the use of suggested/predicted computer resources. Other features and functions of the interactive GUI 104 are discussed in detail below, or would be apparent to one of skill in the art.

FIG. 1 further illustrates a number of applications 106 which generally represent examples of computer resources which may be provided to the user by the location-based resource manager 102. For example, as described in detail herein, the location-based resource manager 102 may utilize historical location information associated with the user to predict, based on a current or future location of the user, a desired use of one or more of the applications 106. Consequently, as also described, the location-based resource manager 102 may be configured to automatically provide the user with predicted ones of the applications 106, so as, for example, to thereby enhance in efficiency and productivity of the user.

In this regard, various examples of the applications 106 are provided herein. Of course, it may be appreciated that the applications represent merely one type of computer resource which may be predicted or provided by the location-based resource manager 102. Consequently, it may be appreciated that virtually any type of computer resource which may be utilized by a user may be predicted and/or provided by the location-based resource manager 102.

For example, such computer resources may include information which is provided to the user, such as, e.g., a text file, an audio file, an image or video file, or virtually any other information which may be computer-provided. In other examples, computer resources may include sensors, actuators, or other hardware or physical devices or actions which are enabled, controlled, or otherwise provided at least in part by operation of one or more computing devices. Thus, it may be appreciated that the term computer resource as used herein refers to virtually any resource that may be directly or indirectly provided to the user, at least in part, by one or more computing devices.

Further in the example of FIG. 1, a location history manager 108 may be configured to construct and maintain a location history 110 which stores information characterizing locations associated with the user of the system 100. For example, the location history 110 may store a plurality of locations at which the user was previously present, along with related information characterizing the locations.

For example, the location history 110 may store such location history using one or more of a latitude/longitude (and/or other coordinate-based geospatial characterizations of each location), a name associated with governmental, territorial, regional, or political boundaries (e.g., a state, territory, town, city, or other municipality), a name associated with a business (e.g., a retail establishment open to the public, or a business location associated with an employer of the user), and/or a personal name or nickname associated with a location by the user (e.g., referencing a particular street address as being associated with the name "home" or "work"). Thus, it may be appreciated that the location history manager 108 may be configured to store location information associated with the user of the system 100 within the location history 110 using virtually any known, conventional, or yet to be developed techniques for representing or otherwise characterizing one or more locations at which the user has been present, may be present in the future, or is otherwise associated with the user.

The location history 110 may include such location information to a desired level of specificity, and organized according to virtually any known or desired technique for organizing and storing data. For example, the location history 110 may store a previous location of the user to a level of detail that includes a particular room on a particular floor of a particular building in a given city. In additional or alternative examples, the location history 110 may simply designate the user's presence within the city as a whole. Consequently, the location history 110 may be organized to store the users' previous or possible locations, including organizing the more detailed or specific representations of locations as subsets of the less detailed or more general location representation(s). For example, the location history 110 may store a plurality of locations which are designated as particular street addresses within a larger city.

In some implementations, the location history 110 may store such location information in conjunction with related information which is helpful in characterizing the location information in a useful way. For example, the location history manager 108 may store the location history including associating a time or time period at which the user was present at each specific location. Further, the location history manager 108 may therefore store a route used by the user in traveling between two or more of the locations. For example, the location history 110 may thus store locations of the user in a continuously developing route which tracks movement of the user between all previous locations. In other examples, the location history manager 108 may store such route information for the user according to specific subsets of movement by the user between the locations. For example, such movement between locations may be tracked on a daily basis, or according to some other designated unit of time, or may be tracked with respect to a particular event and/or time period designated by the user (e.g., all locations traversed by the user during a particular trip, such as a work assignment or personal vacation, may be stored as such).

Various other types of information characterizing the various locations may be stored by the location history manager 108 within the location history 110, as well. For example, as referenced above, the various locations may be associated with home, work, vacation, school, shopping, or virtually any other designated purpose or characterization which may be assigned by the user and/or derived by the location history manager 108. Various other types of location information that may be stored in the location history 110, along with various manners in which such location information may be determined, stored, and utilized, are provided in detail herein, or would be apparent to one of skill in the art.

The location history manager 108 may be configured to populate and maintain the location history 110 using one or more of a variety of techniques, some examples of which are discussed herein. For example, the location history manager 108 may utilize the interactive GUI 104 to obtain location information from the user directly. For example, the location history manager 108 may use the interactive GUI 104 to receive location information, such as, e.g., previously visited locations, and associated characterizations thereof.

For example, the location history manager 108 may utilize interactive GUI 104 to present the user with a series of questions regarding past or possible future locations visited by, or otherwise associated with, the user. In other examples, the location history manager 108 may utilize the interactive GUI 104 to obtain or locate information associated with the user which may be used to derive or otherwise determine location information regarding the user. For example, the location history manager 108 may access travel logs, past purchase histories associated with travel by the user (e.g., airline, train, hotel, or rental car receipts), personal blogs or other computer-based journals or other websites associated with the user which may include location information for the user, or virtually any other computer-accessible information which may be useful in deriving or otherwise determining the location history 110.

In other examples, locations of the user may be directly detected and tracked for storage within the location history 110 using one or more of a plurality of location sensors. For example, such location sensors may include global positioning systems (GPS), Wi-Fi based location techniques, compasses, accelerometers, and virtually any other sensor or device which may be used to directly or indirectly determine a location. More detailed examples of such location sensors are described in detail below, e.g., with respect to the location monitor 116 of FIG. 1. However, it may generally be appreciated that the location history manager 108 may be operable to interface with any or all such location sensors (e.g., directly, or indirectly through the location monitor 116), and to thereafter store the resulting obtained location information in a desired format within the location history 110.

For example, during a configuration of the location-based resource manager 102, e.g., by an administrator or by the user, the interactive GUI 104 may be used to accept various preferences regarding storage and use of the location history 110. For example, as referenced above, locations may be stored to varying levels of detail, using various associated tags or other characterizations associated therewith, and organized spatially and/or temporally in a desired manner. Thus, it may be appreciated that the interactive GUI 104 may be used to define or configure all such designations and preferences, whereupon the location history manager 108 may thereafter implement such designations and preferences with respect to receipt of any later-received location information, including such location information received from one or more location sensors.

Meanwhile, somewhat analogously, a resource usage manager 112 may be configured to create and maintain a resource usage history 114 associated with the user. As described above, the term resource in this context should be understood to represent virtually any resource which may be available to, or useful to, the user, and which may be directly or indirectly accessed using one or more computing devices. In the specific example of FIG. 1, as illustrated herein and described above, such resources are primarily described with respect to the examples of applications 106. However, various additional or alternative examples are also provided herein in which resources monitored by the resource usage manager 112 include various other types of software resources, as well as designated hardware resources, such as, e.g., specific computing devices, sensors, or any other hardware which may be useful to the user.

For example, the resource usage manager 112 may track or otherwise determine a manner in which such resources have been provided to, or used by, the user, and may thereafter store such resource-related information within the resource usage history 114. For example, the resource usage manager 112 may execute software which tracks a time at which each of the applications 106 is opened or closed by the user, and/or may track the various manners in which the user implements the applications 106.

For example, the applications 106 may include a browser application used to access the internet, in which case the resource usage manager 112 may track and monitor a time at which the browser is opened/closed by the user, as well as a list of websites or other information accessed by the user using the browser application of the example. Of course, similar comments apply to virtually any other software application which may be utilized by the user, where the manner in which the resource usage manager 112 characterizes or otherwise determines a type or extent of usage of a given application will be understood to be dependent upon the nature of the application in question. For example, where the applications 106 include a calendar or email application, a resource usage manager 112 may track appointments, email recipients, and other information characterizing usage of the applications in question.

As with the location history manager 108, the resource usage manager 112 may utilize the interactive GUI 104 to allow the user to provide preferences and other designations and configurations governing a manner in which the resource usage manager 112 collects, characterizes, and stores the resource usage history 114. For example, the user may utilize the interactive GUI 104 to designate names, associations, or other characterizations with specific resources or groups of resources. For example, some resources may be associated with a characterization such as "work," while other resources may be associated with the designation "home."

In further analogy with the location history manager 108 and the location history 110, the resource usage manager 112 may obtain resource information directly through input thereof by the user through the interactive GUI 104, through derivation thereof from computer-accessible documents or other data associated with the user, or directly through tracking and monitoring of specific resource usages. Accordingly, it may be appreciated that the resource usage manager 112 may be configured to combine any and all such received resource usage information in a common, desired format for storage within the resource usage history 114.

Thus, it may be appreciated that while many various functions and operations of the location history manager 108 and the resource usage manager 112 may be specific to the respective components, many parallels and similarities may exist in the operations thereof, as well. That is, on the one hand, it may be appreciated that the location history manager 108 may execute several functions with respect to the obtaining and characterizing of location information in a manner which is not relevant to, or executed by, the resource usage manager 112. On the other hand, however, as referenced above, it may be appreciated that at a conceptual level, the managers 108, 112 may be similarly or analogously configured to obtain, maintain, store and access their respective types of data.

For example, as referenced, both managers 108, 112 may be configured to obtain their respective types of data directly or indirectly, automatically or through user input, and/or algorithmically through analysis of computer accessible information. As a further example, it may be appreciated that the interactive GUI 104 may be utilized by the user to configure one or both of the managers 108, 112 with respect to any privacy concerns of the user. For example, the user may designate certain locations, times, and/or resources for non-inclusion within the histories 110, 114. For example, the interactive GUI 104 may be utilized by the user to prospectively designate such non-inclusion of specified locations/resources, while, in additional or alternative examples, the interactive GUI 104 may be utilized by the user to delete or otherwise remove previously-stored locations and/or resources from the respective histories 110, 114. Various other aspects and utilizations of the managers 108, 112 and their respective histories 110, 114 are described in detail herein, or would be apparent to one of skill in the art.

In operation of the system 100, a resource predictor 118 may be configured to access the location history 110, the resource usage history 114, and a location of the user (e.g., as determined by the location monitor 116), and to thereafter generate a prediction of one or more computing resources that are likely to be useful to the user at a present or future time, based thereon. For example, as described in detail below (e.g., with respect to FIGS. 3 and 4), the resource predictor 118 may be configured to implement supervised machine learning (SML) techniques to generate a prediction algorithm which is designed to generalize from specific data included within the histories 110, 114, to thereby make specific predictions regarding current or future use of one or more computing resources. In this way, users may be conveniently provided with predicted computing resources in a fast, efficient, and convenient manner, based at least on a location of the user.

For example, as referenced above, many users may display usage patterns from which such prediction algorithms may be generated. For example, the user may commute to work every weekday, and may open the same application or group of applications on the user's work computer every morning. Consequently, the location-based resource manager 102 may be configured to determine such patterns, and to predict that, upon the user's arrival at work on a Tuesday morning, the applications 106 should be automatically opened and provided to the user, perhaps configured in a manner that has further been predicted to be of optimal use for the user.

More specifically with respect to the features of the location-based resource manager 102 described above, it may be appreciated that in the above example, the location history 110 may store a location history of the user which includes the presence of the user at a particular office at a particular street address at which the user works. As described, such location history location information may be determined from the location history manager 108, perhaps by way of the location monitor 116, over a defined period of time.

At the same time, the resource usage manager 112 may detect and record usage of the applications 106 by the user, perhaps including specific times associated with such uses, and/or specific configurations or implementations of the applications 106. For example, the resource usage manager 112 may include software which is designed to automatically track keystrokes, mouse movements, or other physical actions of the user in utilizing one or more computers, and/or may include software which is configured to record software-based actions taken by the user with respect to one or more of the applications 106. In the latter regard, for example, the resource usage manager 112 may include software which tracks a browsing history of the user with respect to a web browser, or may track usage patterns associated with an email program utilized by the user, or virtually any other software based action which may be associated with the applications 106.

As referenced above, the resource predictor 118 may utilize the location history 110 and the resource usage history 114 to construct prediction algorithms associated with the user which relate the above described information, and which reasons therefrom to predict future resource usages. Consequently, as described above, upon determination of a location of a user at the relevant work-related location, as may be determined by the location monitor 116, the resource predictor 118 may predict use of the applications 106 by the user.

In another specific, non-limiting example, the user may, over a period of time, visit a number of restaurants or other retail establishments. In conjunction with each visit, the user may utilize a web browser or other software application designed to provide recommendations or other information associated with the particular retail establishment in question. Consequently, the location history manager 108 and the resource usage manager 112 may populate the location history 110 and the resource usage history 114, respectively, with each such visit and associated resource usage. For example, the location history 110 may therefore indicate that the user has previously visited a particular restaurant at a particular location, and the resource usage history 114 may indicate particular ones of the applications 106 used by the user at a corresponding time. In a particular example, the resource usage history 114 may indicate a particular webpage associated with restaurant reviews, and, in particular, with a particular restaurant that was visited. Consequently, at a later time, the user may again be located in a proximity to the particular restaurant, as may be determined by the location monitor 116. As a result, the resource predictor 118 may predict that the user will wish to see the previously-viewed restaurant recommendation.

Thus, in these and other examples, a resource provider 120 may be configured to receive the prediction generated by the resource predictor 118, and to thereafter provide the predicted resource to the user based thereon. For example, in the examples just given, the resource provider 120 may be configured to load, open, or otherwise provide one or more of the applications 106, perhaps configured in a manner predicted by the resource predictor 118 to be optimal for the user at a given point in time and at a given location, such as on a Tuesday morning at the user's place of work. Similarly, the resource provider 120 may be configured to provide the predicted restaurant recommendation, or other predicted information which is predicted to be of use to the user at a particular point in time and at a particular location, such as, e.g., outside of the restaurant.

In the example of FIG. 1, the resource provider 120 is illustrated as including an input handler 122 which may be configured to receive input from the user regarding the predicted and provided resources, perhaps by way of the interactive GUI 104. A view generator 124 may be configured to provide one or more views to the user for allowing the user to accept, reject, modify, or otherwise utilize the provided resources. Again, as described in detail below, the view generator 124 may operate by way of the interactive GUI 104. Finally with respect to the resource provider 120, an application manager 126 is illustrated which may be understood to represent one or more specific components and associated features and functions for interacting with the applications 106, so as to thereby enact the providing of the resources predicted by the resource predictor 118.

That is, as referenced above, the example of FIG. 1 primarily contemplates that the resources provided by the location-based resource manager 102 include the applications 106, so that the application manager 126 may be understood to represent, e.g., one or more specific application program interfaces (APIs), which may be configured to interact with specific ones of the applications 106 to achieve a desired result in providing predicted ones of the applications 106 to the user. Of course, it may be appreciated from the present description that the application manager 126 is merely intended to represent one type of example of components which may be used by the resource provider 120 to provide predicted resources, and that other such components may be utilized to provide other, corresponding types of resources.

For example, the resource provider 120 may include components designed to interact with one or more operating systems, remote servers, or virtually any other computing resource which requires and utilizes software management. Similarly, the resource provider 120 may include various components which are designed to interact with various predicted computing resources which may include hardware, instead of, or in addition to, software-based resources. For example, as referenced above, computing resources which may be predicted and provided by the location-based resource manager 102 may include, sensors, actuators, cell phones, televisions, digital video recorders, personal computing devices, home automation systems, security systems, or virtually any other type of computing resource that is mentioned herein or that would be apparent to one of skill in the art.

In example implementations of the system 100 of FIG. 1, the resource predictor 118 may thus predict usage of one or more computer resources, and the resource provider 120 may thereafter attempt to provide the predicted computing resources to the user. In some examples, the resource provider 120 may be configured to provide all predicted computing resources to the user, at a time of the prediction. For example, continuing the example above, a resource predictor 118 may predict usage of five different applications 106 upon arrival of the user at work, whereupon the resource provider 120 may be configured to utilize the application manager 126 to provide all five of the predicted applications 106.

In other examples, however, the resource provider 120 may be configured differently. For example, the resource provider 120 may utilize the view generator 124 to provide a listing or other representation of the predicted computing resources, so that the input handler 122 may thereafter receive particular selections from the user specifying which of the (in this case, five) predicted computing resources are actually desired by the user at the present time. As described, the interactive GUI 104 may be utilized for these purposes, e.g., providing a listing or other representation of predicted computing resources, and thereafter receiving information from the user as to whether and how such predicted computing resources will be used.

In particular, related implementations, it may occur that the resource predictor 118 provides predictions of computing resources which are associated with confidence measurements indicating a relative confidence of the prediction with respect to how likely the user is to utilize the predicted resource in the predicted manner at the predicted time. In such implementations, the resource provider 120 may provide computing resources associated with the highest confidence levels, may offer the user optional use of computing resources associated with relatively lower confidence levels, and may not provide any computing resources which are predicted and which are associated with the lowest confidence levels (e.g., confidence levels below a certain threshold).

In particular example implementations, the location-based resource manager 102 may also be configured to provide computing resources to the user based on a future location, or potential future location. For example, the user may utilize the applications 106 to plan a work-related or personal trip to a particular location, e.g., to a particular city in a particular foreign country. Resource predictor 118 may utilize the location history 110 to determine that the user has never previously visited the city and country in question. The resource predictor 118 may further access location history 110 and the resource usage history 114 to determine resources used by the user in previous travels. For example, the resource predictor 118 may determine that during multiple international travels over the past year or other defined time period, the user's location and resource histories 110, 114 indicate that the user is likely to utilize a map or associated directions for the city in question, other tourism-related information in question, and/or contact information for friends or co-workers who are geographically proximate to the city in question. Similarly, the resource predictor 118 may determine that the browser history or other resource usage history information associated with the user indicates a familiarity (or lack of familiarity) of the user with a native language spoken in the country in question, and make a corresponding prediction based thereon (e.g., may predict a need for language-related resources, such as language translation websites).

In such examples, the resource provider 120 may be configured to receive any and all of the various predictions referenced above from the resource provider 118, and to thereafter provide the relevant resources according to a current configuration of the resource provider 120. For example, as just referenced, the resource provider 120 may be configured to provide the various resources according to a confidence level or other parameter associated with the prediction in question. In still other examples, the resource provider 120 may be configured to provide a particular computing resource in a manner which matches previously stated user preferences. For example, the user may indicate preferences to receive certain types of computing resources on particular computing devices (e.g., may always prefer to receive map-related information on a mobile device designated by the user). As may be appreciated from the above discussion, all such user preferences and other configurations of the resource provider 120 may be obtained from the user using, e.g., the interactive GUI 104, the input handler 122, and the view generator 124.

In further related examples, the resource predictor 118 may discern particular usage patterns correlated with corresponding locations from the histories 110, 114. For example, the user may demonstrate patterns of being in certain locations at certain times, arriving home from work, or at a particular appointment or type of appointment in time, or within a certain timeframe. For example, the user may arrive home from work by a particular time each weekday. Consequently, in a specific example, the resource predictor 118 may determine that one or more factors may be in play which may hinder the user in adhering to the established pattern. For example, based on knowledge that traffic may be problematic at a given time or given location, the resource predictor 118 may generate a prediction that the user should be notified to leave at an earlier than normal time, and/or they be notified to utilize a different route in order to establish the existing usage pattern.

In these and other examples, it may be appreciated that the resource provider 120 may utilize appropriate resources to achieve desired results. For example, in the examples just given in which the resource predictor 118 generates a prediction designed to assist the user in adhering to an established usage pattern, the resource provider 120 may use email applications, calendar applications, or virtually any messaging application which allows the resource provider 120 to notify the user of the generated prediction.

For example, the applications 106 may include a calendar application (which may also be used by the resource usage manager 112 at least partially to determine the usage pattern in question as stored within the resource usage history 114) to provide notification of the generated prediction to the user in a context-sensitive manner. For example, if the relevant usage pattern indicates the preference of the user to arrive at an appointment 15 minutes early, then the resource provider 120 may interact with the calendar program to provide the relevant calendar entry (e.g., the relevant appointment or meeting) to the user, in conjunction with information regarding the prediction that additional action should be taken in order to maintain the relevant usage pattern, and along with any relevant computing resources which may be necessary or helpful in assisting the user in maintaining the usage pattern in question (e.g., map or GPS-based information). In additional or alternative examples, as referenced above, the resource provider 120 may interact with an email program included with the applications 106 to generate and send an email to the user with the generated prediction, along with any other predicted and provided computing resources determined to be of use.

In the example of FIG. 1, the location-based resource manager 102 is illustrated as being executed using at least one computing device 128. As shown, the at least one computing device 128 may include at least one processor 128A, as well as a compute readable storage medium 128B.

It may be appreciated that the at least one computing device 128 may, as referenced above, include two or more computing devices, which may be in communication with one another using one or more wired or wireless connections. Similarly, the at least one processor 128A may represent two or more processors which execute various processing tasks in parallel with one another in order to obtain increased speed and efficiency. The computer readable storage medium 128B may include any suitable computer memory which may store executable instructions which, when read and executed by the at least one processor 128A, causes the at least one processor 128A to execute the various functions described herein with respect to the location-based resource manager 102.

Of course, the computer readable storage medium 128B may represent two or more memories configured to store additional or alternative types of information, as well. For example, the computer readable storage medium 128B may represent one or more memories configured to store data associated with the operation of the location-based resource manager 102, such as, e.g., one or both of the histories 110, 114.

Of course, the system 100 and variations thereof may include or utilize many other types of conventional hardware and/or software components, which are not explicitly illustrated in the example of FIG. 1, for the sake of clarity and conciseness. As a result, it may be appreciated that the system 100 of FIG. 1, and variations thereof, may be implemented in many different embodiments, depending upon designer choices related to the use of such conventional hardware and/or software. Many different examples of such hardware, software, and/or configurations and usage thereof, are provided herein, e.g., with respect to FIG. 5, and/or would be apparent to one of skill in the art.

With respect to FIG. 1, however, some illustrative, non-limiting examples may include, for example, execution of some or all of the location-based resource manager 102 by virtually any personal or professional computing device, e.g., smartphone, tablet computer, laptop, netbook, personal computing device, or network station. Thus, for example, it may occur that all of the above-described components of the location-based resource manager 102 may execute on a smartphone, tablet computer, or other individual device of a user thereof.

In other example implementations, however, instances of the location-based resource manager 102, or portions thereof, may execute on two or more devices in communication with one another. For example, information stored in one or both of the histories 110, 114 may be collected, aggregated, and/or stored in a single location, using data obtained by, or collected in conjunction with, two or more individual computing devices. In such implementations, a first computing device having relatively more computing resources (e.g., greater processing speed, or larger amounts of available memory) may be utilized to store the histories 110, 114.

Meanwhile, one or more other devices may also be used to collect such information, and communicate this information to the first computing device for storage thereon. For example, a user may own a smartphone and a tablet computer, and may travel frequently with one or both. Meanwhile, the user may also own a desktop computer which has relatively greater computing resources than either the smartphone or the tablet computer. In example scenarios, therefore, information used to populate the histories 110, 114 may be collected in conjunction with any one of the three devices owned by the user.

For example, the desktop computer may be used to provide the interactive GUI 104 to collect information directly from the user, while the smartphone and/or the tablet computer may implement an instance(s) of the location monitor 116, perhaps in conjunction with corresponding location-based sensors, to collect location-related or resource usage-related information for subsequent storage using the desktop computer of the user. Further in such example embodiments, it may be appreciated that the first computing device (e.g., the desktop computer of the user) having relatively greater computing resources also may be used to perform relatively more resource-intensive calculations and other processing associated with execution of the location-based resource manager 102. For example, in the example scenarios just described, the desktop computer of the user may be used to execute the supervised machine learning algorithms referenced above and described in detail below with respect to FIGS. 3 and 4, to thereby enable the above-described features of the resource predictor 118.

Thus, it may be appreciated that in the example scenarios, each of the three devices of the user may execute the location-based resource manager 102, so as to thereby, for example, collect information to populate the histories 110, 114, and to otherwise provide benefits described herein with respect to the location-based resource manager 102. For example, with respect to the smartphone of the user, an appropriate version of the interactive GUI 104 may be provided to the user to provide configuration or other interaction with the location-based resource manager 102. Similarly, an optimized instance of the resource provider 120 may be provided for use on the smartphone of the user. For example, the application manager 126 may be optimized and otherwise configured to interact with applications which are available on the smartphone of the user. Of course, similar comments apply with respect to optimizations and other configurations of instances of the location-based resource manager 102 on the tablet device of the user, as well as on the desktop computer of the user, as described above.

In additional or alternative examples, the at least one computing device 128 may include a remote server computer which is in communication with one or more of the three user devices referenced in the examples above. For example, whereas in the previous examples, the three user devices may communicate with one another by way of a wireless connection (e.g., using a personal home network of the user), in the additional or alternative examples in which a remote server computer is used, it may occur that one or more of the 3 devices communicates therewith over an appropriate wide area network, such as the public internet. In this way, such a remote server may represent an easily and centrally accessible site for storage of some or all of the information stored in the histories 110, 116, as well as a relatively greater amount of processing speed and other computing resources.

For example, in scenarios commonly referred to as cloud based computing, such a remote server may represent one or more remote servers which operate in conjunction with one another to provide computer functionalities and resources to users over the internet. As a result, a need for individual device resources of the user may be lessened, while the user is nonetheless provided with easy, network-based access to all such computing resources which may be necessary or desirable for enjoying the various features and functionalities of the location-based resource manager 102 as described herein.

For example, similar to the examples above, the three devices of the user may each be in communication with one or more remote servers executing an instance of the location-based resource manager 102. In this way, any time the user has access to one or more of the three example devices, the user may provide data to facilitate current or future uses of the location-based resource manager 102 (e.g., may provide information to update one or both of the histories 110, 116, to thereby improve an accuracy of the resource predictor 118), and/or may receive one or more available resources associated with the device in question, by way of an instance of the resource provider 120 operating thereon.

In the example of FIG. 1, the location-based resource manager 102 is illustrated as including the various discrete components shown therein, and described above. Of course, it may be appreciated that the various other implementations of the system 100 may provide the above-described features and functionalities using different embodiments than the specific example of FIG. 1. For example, two or more components may be executed by a single component, while, in other examples, functionality described above with respect to a single component may in fact be executed by two or more different components, perhaps executing on two or more different computing devices. Moreover, additional components not specifically illustrated in FIG. 1 may be included, while one or more components which are illustrated may be omitted.

For example, in the example implementations described above in which the at least one computing device 128 includes one or more remote servers, it may be understood that an instance of the location-based resource manager 102 executing thereon may not include a location monitor 116, inasmuch as it may be appreciated that a location of the remote server itself is not relevant to an operation of the location-based resource manager 102 with respect to a particular user. Of course, various location support services (e.g., mapping and/or GPS-related services) may be provided or supported by a remote server, as would be apparent. Conversely, as referenced above, it may be appreciated that, in such example implementations, some or all of the functionality of the resource predictor 118 may be provided exclusively by the remote server. That is, for example, it may occur that the construction and use of algorithms associated by the resource predictor 118 may be executed by the remote server, for subsequent communication of any relevant resource predictions to an individual user device, e.g., the smartphone of the user, whereupon subsequent providing of the predicted resource may occur through the use of the instance of the resource provider 120 executing on the device in question.

Thus, it may be appreciated that the system 100 in the example of FIG. 1 may be implemented in many different ways, in order to thereby provide resources to a user based on a location and location history of the user. In this way, as described, the user may be provided with such computing resources in a fast, convenient, and efficient manner, and may thereby utilize such resources in a more productive and/or enjoyable manner.

Figure 2:
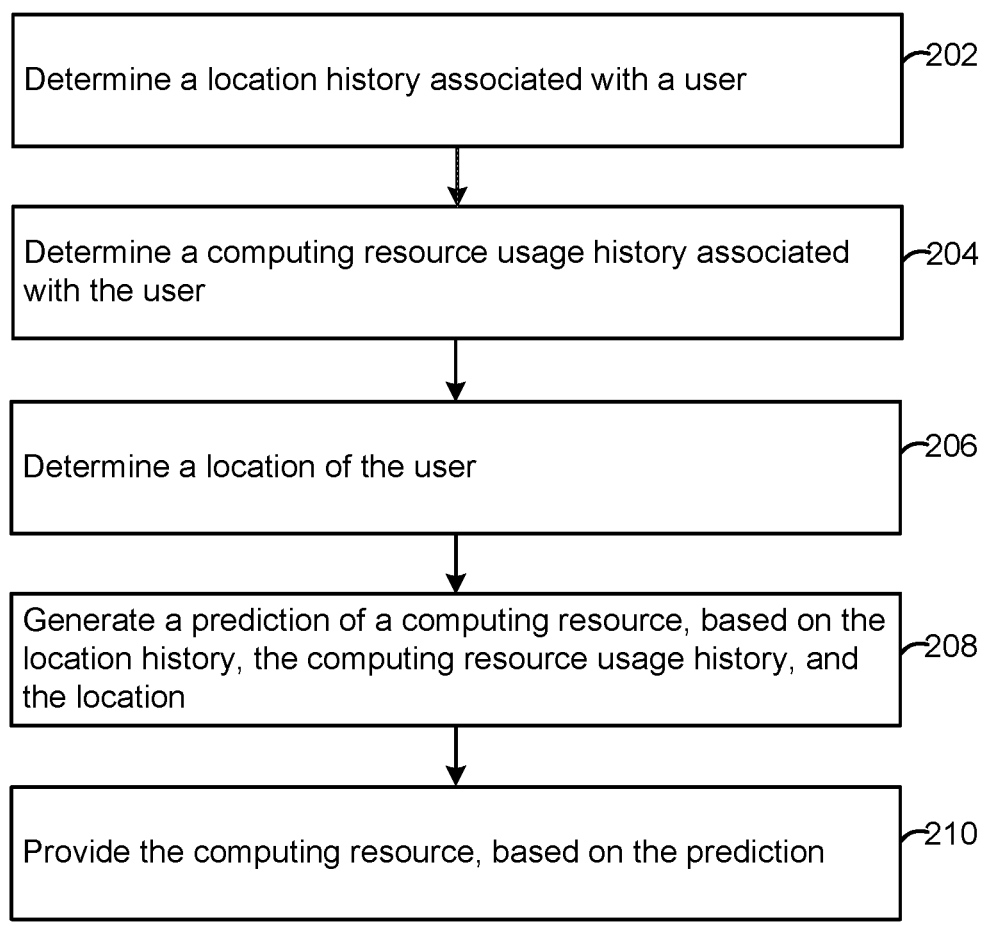
FIG. 2 is a flowchart illustrating example operations of the system of FIG. 1.

FIG. 2 is a flowchart illustrating example operations of the system 100 of FIG. 1. In the example of FIG. 2, example operations 202-210 are illustrated as discrete steps executing in sequential order. However, it may be appreciated that FIG. 2 represents an illustrative, non-limiting example of the operations of the system 100, so that many other variations may be implemented as well. For example, two or more of the illustrated operations may occur in a partially (or completely) overlapping, parallel manner, and/or two or more of the illustrated operations may occur in a nested, iterative, or looped manner. Further, any operation of the example of FIG. 2 may be performed as two or more sub-operations, while, conversely, two or more of the illustrated examples may be combined for execution in a single operation. Moreover, it may be appreciated that additional or alternative operations may be included, while one or more of the illustrated operations may be omitted.

In the example of FIG. 2, a location history associated with the user may be determined (202). For example, the location history manager 108 may determine such location history information for inclusion within the location history 110, as described above. For example, as referenced above, one or more devices of the user may be used to input, collect, infer, extract, or otherwise determine location history information associated with the user. Such location history information may thus be determined using two or more user devices, and may be collected, aggregated, and stored within the same or different devices, e.g., may be stored in a memory of a remote server computer.

A computing resource usage history associated with the user may be determined (204). For example, the resource usage manager 112 may be used to monitor, track, collect, infer, extract, or otherwise determine resource usage history information associated with the user for storage within the resource usage history 114, as described above. As also described above with respect to location history, it may occur that the resource usage history is determined by, and with respect to, two or more devices of the user, perhaps in conjunction with a remote server computer. For example, resource usage may be determined with respect to two or more devices of the user, and stored in the resource usage history 114 at the remote server. It may be appreciated that such resource usage and associated history may be particular to a given device of the user, or may be generic with respect to two or more of the devices. For example, usage of a resource such as GPS may be particular to a smartphone of the user having that functionality, which may not be available or associated with the desktop computer of the user. Conversely, a usage of an internet browser may be more or less generic with respect to both the smartphone and the desktop computer, e.g., with respect to a viewing or other usage history of the browser.

A location of the user may be determined (206). For example, the location monitor 116 may utilize one or more location-based sensors to ascertain a current location of the user to a desired level of accuracy. In other example implementations, the location history manager 108 may receive a location of the user by way of the interactive GUI 104. For example, the location may include a current location of the user received by way of the interactive GUI 104, or, in the examples above, may include a potential future location of the user, such as a location to which the user plans to travel at a certain designated time.

A prediction of a computing resource may be generated, based on the location history, the computer resource usage history, and the location (208). For example, the resource predictor 118 may generate a resource prediction based on the relevant portions of the histories 110, 114, as well as a current location as received by the location monitor 116. As described herein, a SML algorithm may be used to input designated portions or aspects of the information from the histories 110, 114 in conjunction with information regarding the location of the user, e.g., from the location monitor, and to thereby output a prediction of one or more computing resources that may be of use to the user.

The computing resource may be provided, based on the prediction (210). For example, the resource provider 120 may provide one or more of the applications 106 to the user, based on the resource prediction received from the resource predictor 118. As described, the resource provider 120 may include the application manager 126 which may be configured to interact or otherwise communicate with selected ones of the applications 106, so as to thereby initiate, instantiate, or otherwise start or configure, selected ones of the applications in a desired manner, e.g., in accordance with the resource prediction.

Thus, providing the resource may include, as just referenced, an actual loading, instantiating, or executing of an application or other resource. However, it may be appreciated that such providing also may include, as referenced herein, providing a selection or option for selection (or rejection) of the provided resource. For example, in the context of the examples above in which the resource includes an application(s), it may occur that the resource provider 120 provides the user with the resource including providing a pop-up window or other interactive element which identifies the predicted/provided application. In more specific examples, such a pop-up window may include a listing of one or more applications (and/or associated configurations thereof), and the user may select "yes" or "no" to indicate whether the resource provider 120 should proceed with the actual loading/instantiating/executing of the selected application(s).

In other examples, the resource provider may execute an initial loading of the application, but with a pre-determined time limit, after which a failure by the user to select the application will result in a closing of the application. For example, the resource predictor 118 may predict that a browser application should be provided, and may provide a browser window, perhaps in a partially transparent manner which indicates to the user the temporary nature of the provided browser window. If the user selects the browser window within the pre-determined time frame (e.g., on the order of seconds or minutes), then the resource provider 120 may fully instantiate the browser window until it is proactively closed by the user. Otherwise, if the user does not select the browser window, then the browser window may fade out or otherwise close at the end of the pre-defined time window.

Many other additional or alternative example embodiments may be implemented. For example, in generating a resource prediction, the resource predictor 118 may have access to additional information for use in constructing, selecting, and executing one or more prediction algorithms. For example, in addition to information from the histories 110, 114, and the current location of the user as determined from the location monitor 116, the resource predictor 118 may determine a current resource usage of the user, which, as described above, may be received from the resource usage manager 112 (i.e., from associated tracking software or other techniques for determining current resource usage).

Figure 3:
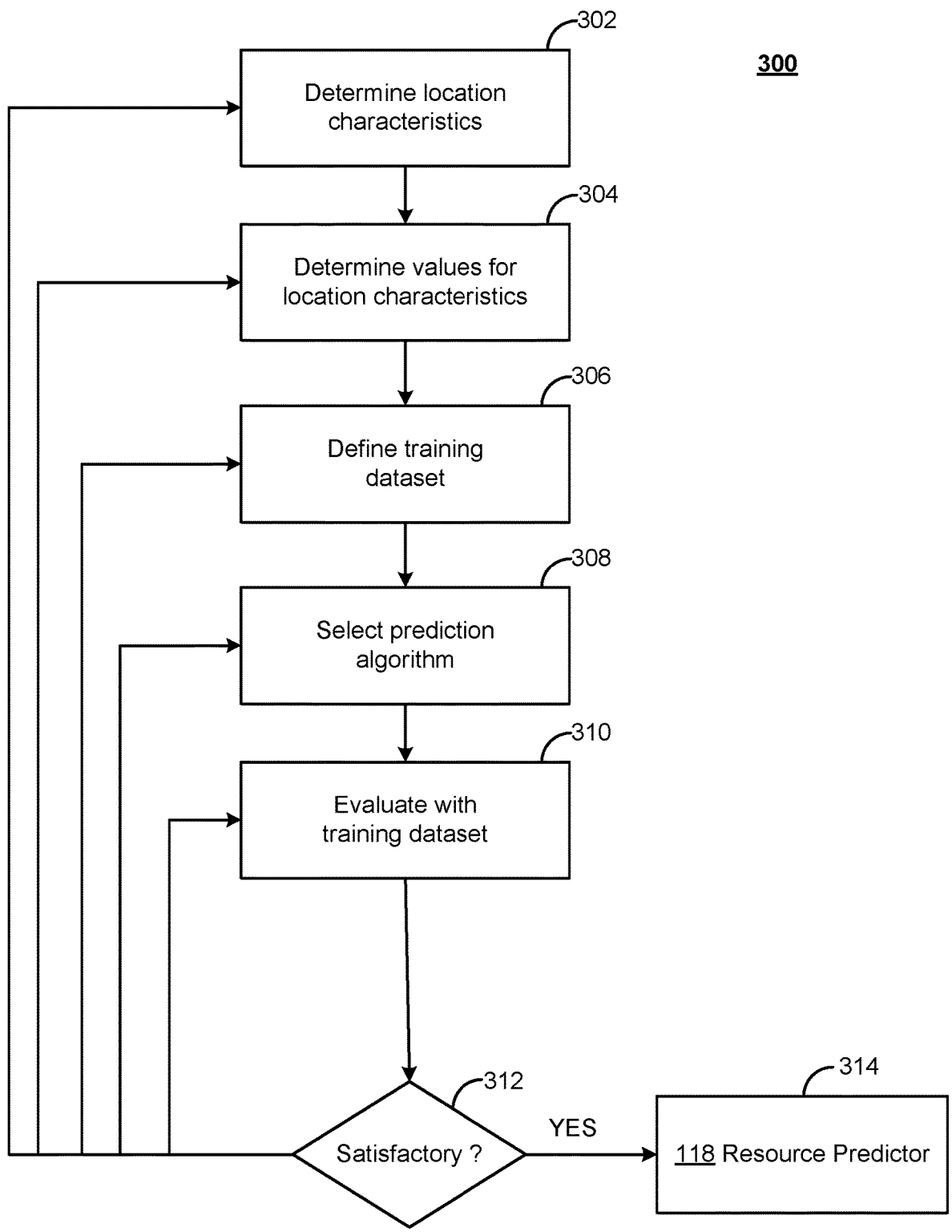
FIG. 3 is a flowchart illustrating a machine learning algorithm for predicting resource utilization by the user, for use with the system of FIG. 1.

Such information may, depending on a prediction algorithm available for use, have an effect on which computing resources are predicted to be useful to the user. For example, if the user is in a certain location and has certain historical location/resource usage history information, it is still the case that the user may currently be using different types of hardware and/or software resources at a given point in time. For example, at a given point in time, the user may be at a certain location and may be utilizing a smartphone having certain applications loaded thereon, a certain subset of which may be in current usage. At a different point in time, the user may be at the same location but may be using a tablet computer, which may have different applications available and/or in current use. Consequently, at each point in time, the resource predictor 118 may make entirely different predictions regarding which applications 106 or other computing resources may be useful to the user. Thus, current resource usage(s) of the user represents an example of an additional parameter which may be helpful in improving an accuracy of the one or more prediction algorithms used by the resource predictor 118. FIGS. 3 and 4 and the below discussion provide additional example techniques for the implementation and use of such prediction algorithms.

FIG. 3 is a flowchart 300 illustrating additional example operations of the resource predictor 142 of the system of FIG. 1. More specifically, in FIG. 3, the resource predictor 142 is illustrated as executing a supervised machine learning (SML) technique(s), which generally represent a way to reason from external instances to produce general hypotheses, e.g., to reason from past location characteristics to obtain a general prediction about whether a current or future resource predicted for the user will be provided and configured in a manner that is satisfactory to the user.

In FIG. 3, location characteristics are determined (302). For example, the resource predictor 142 may determine a universe of possible location characteristics, perhaps in conjunction with a configuration of the location history 110. Thus, such location characteristics may include, for example, types or categories of locations, e.g., work, home, personal travel, or work travel, and/or a street address, city, or state, and/or business, tourist, or governmental, and/or latitude, longitude, or other geospatial coordinates, and/or route information for tracking movements between locations. In other words, the location characteristics include any and all such locations or types of locations which may potentially have predictive value for predicting whether and how particular computer resource(s) will be desired by a user at that location or in association therewith.

Then, for these location characteristics, values may be determined (304). For example, historical values form the location history 110, along with corresponding values from the resource usage history 114, may be determined. For example, of the various location characteristics set forth above, associated values may be determined. For example, a value for the location characteristic of "personal travel" may include all instances of vacations or other personal travel of the user, e.g., destinations, hotels, modes of transportation, times/dates of travel, and any other specific value associated with locations categorized as being associated with "personal travel." Further, the determined values may include, in this context, values for associated resources used in conjunction with the values for the location characteristics. For example, in the "personal travel" example, the resource usage history 114 may indicate that at a first destination associated with a first instance of "personal travel," the user utilized a smartphone to implement a particular application. Meanwhile, at a second destination associated with a second instance of "personal travel," the user may have utilized a netbook computer to implement a second application.

Similar values may be collected for the various location characteristics described above, and for combinations thereof. For example, a single location may be designated as "work," as a particular street address, and as a geospatial coordinate set, all of which may refer to the same physical location. Values may be determined for each location characteristic, and thus, in the example, may overlap when referring to the same physical location.

Then, a training data set may be selected (306). For example, a particular subset of the location characteristics may be defined as potentially being predictive about future resource usages of the user with respect to a location of the user. For example, in the above examples, a first such subset may include location characteristics (and associated values) which include "home" and "personal travel," while a second subset may include "work" and "work-related travel." In other words, different subsets may be selected which may potentially have predictive power in predicting future resources usages of the user, either at the selected location(s) associated with the subset, or more generally at any location.

A prediction algorithm may be selected (308). A number of such prediction algorithms exist and may be selected here as needed. In general, the criteria for a success or utility of a prediction algorithm (and resulting prediction model) is whether such an algorithm/model is, in fact, successful in predicting whether a user at a given location will find it useful or helpful to be provided with a particular computer resource (and configuration thereof). However, additional or alternative criteria may exist.

For example, as described in more detail below, it will be appreciated that the resource predictor 118, and ultimately resource provider 120, is/are capable of making mistakes, e.g., inaccurate predictions. That is, the resource predictor may, for example, predict that the user should be provided with a first application at a first location, when, in fact, the user may not desire the first application at that time/location. On the other hand, the resource predictor 118 may, for example, predict that no application should be provided to the user at a given time/location, when in fact the user would have found a particular application to have been useful.

In the former case, the cost of the mistake of providing a predicted resource which the user does not want (e.g., which the user closes or quits in response to the providing) includes, e.g., a loss of network resources that were used fruitlessly to provide undesired computer resources, as well as a frustration or dissatisfaction of the user. On the other hand, the mistake of not providing a particular computing resource which the user may have found helpful may also be problematic. Such a mistake is referred to herein as a loss, and results in the user being deprived of useful resources that otherwise may have been provided to the user.

Thus, a prediction algorithm may be selected which attempts to maximize the providing of desired computer resources, while minimizing the providing of undesired computer resources. Again, examples of such prediction algorithms are generally well-known and are therefore not discussed here in detail. Such examples may include, e.g., a decision tree algorithm in which nodes of the decision tree represent a location characteristic that is being classified, and branches of the tree represent a value that the node may assume. Then, results may be classified by traversing the decision tree from the root node through the tree and sorting the nodes using their respective values. Decision trees may then be translated into a set of prediction rules (which may ultimately form the prediction model), e.g., by creating a rule for each path from the root node(s) to the corresponding leaf node(s).

Other prediction algorithms exist, and other techniques for inducing results therefrom are known. For example, single-layer or multi-layer perceptron techniques may be used, as well as neural networks, statistical learning algorithms (e.g., Bayesion networks), instance-based learning, and/or support vector machines. Again, one or more of these or other algorithms may be selected and tested, and ultimately implemented based on their success in predicting productive results and/or their success in avoiding lost (i.e., not provided) resources.

Once a prediction algorithm is selected, a corresponding training dataset may be evaluated (310). For example, the resource predictor 142 may be configured to implement the prediction algorithm using a selected training dataset (subset) of the location characteristics and associated values (e.g., computer resources that were used).

If results are satisfactory (312), then they may be formalized as the prediction model and passed to the resource predictor 118, as shown, for use in evaluating current and future location characteristics for their predictive power(s0. Otherwise, as shown, any of the operations 302-310 may be selected and varied in order to re-run the operations of the flowchart 300 to thereby obtain satisfactory results (312).

As referenced above, the operations 300 may be executed at an initial point in time to formulate an initial prediction model. Then, the resource predictor 118 may implement the prediction model accordingly for a period of time. Over time, however, it may occur that the prediction model becomes out-dated and less effective predicting computer resource usage(s) associated with the location(s) of the user.

To avoid this situation, the resource predictor 118 may periodically predict certain usages of computer resources, and then test the results therefrom and/or update the prediction model accordingly. That is, for example, the resource predictor 118 may sometimes provide a computer resource (e.g., application), even with little or no reason to do so based on a current instance of the prediction model, and may observe whether/how the provided resource if used (if at all). Then, the resource predictor 118 may compare the results against the predicted results to determine whether the prediction model remains satisfactory or needs to be updated.

FIGS. 4A-4C are tables illustrating prediction data used to construct a prediction model. In FIG. 4A, it is assumed that two location characteristics are considered (e.g., as determined for inclusion in the training subset), e.g., "location characteristic 1" 402 and "location characteristic 2" 404. A third location characteristic, "location characteristic 3" 406, is illustrated as being present but not considered for the particular training dataset being tested. A shown, the location characteristic 402 may have value of either A or B, while the location characteristic 404 may have value of C or D. For example, the location characteristic of "personal travel" may have the values of "Washington D.C." or "New York" for the values A and B, respectively. Meanwhile, the location characteristic 404 may include "day" or "night," for the values of C and D, respectively.

Then, the location and resource histories 110, 114 may be analyzed to determine whether and how computer resources were consumed by the user at those values of location characteristics. For example, computer resources may be provided to the user, and if the user utilizes the provided resource, e.g., within a given time frame, then the result is counted once within the column 408, indicating that the query should be (should have been) sent. On the other hand, if a second computer resource(s) is provided in conjunction with the features AC and a non-productive result is reached, then the result is counted once within the column 410, indicating that the location characteristic should be (should have been) dropped.

The providing of computer resources in conjunction with the ten location characteristics may thus continue and the results may be tracked accordingly until the columns 408, 410 are filled. Then, a decision regarding future actions to be taken on a newly-received query may be made.

For example, for the combination AC, it is observed in the highly-simplified example of FIG. 4A that 2 results indicated a "provide," while 0 results indicated a "don't provide." Consequently, a decision may be made that a future location characteristic having values AC should be provided with a particular computer resource, as shown in column 412. Similarly, for the query features BD, 1 "should send" result and 0 "should drop" results indicate that future instances of such computer resources should be predicted. Conversely, for the query features AD, 0 "should send" results and 3 "should drop" results indicate that future instances of such queries should be dropped.

In the case of queries having features BC, 2 queries are indicated as "should send," while 2 are indicated as being "should drop." Consequently, it may not be apparent which action should be taken for future queries.

In further analysis in FIG. 4B, the ten location characteristics are sent with features BC, and it is observed in a column 414 that if such resources are provided, 2 should, in fact, have been provided (because useful computer resources were determined), while in a column 416 it is observed that when such location characteristics are considered, 2 should in fact not have been provided. Conversely, when dropped, column 414 indicates 1 computer resource that should have been provided, and 4 that should not have been provided.

Thus, the 1 computer resource that should have been provided but was not, represent a lost opportunity which denied productive results to the user. On the other hand, the 4 resources are associated with location characteristics but would not have yielded productive resource predictions, anyway), and therefore represent a savings in network traffic and resources, and to provide a convenient and productive setting for the user.

A similar analysis applies to FIG. 4C, in which the results are contemplated for the effect of dropping the 10 location characteristics with values BC. There, it may be observed from columns 418, 420 that 2 results (20%) are productive but are not provided and are therefore lost, while 4 (50.5%) are correctly not provided.

Figure 5:
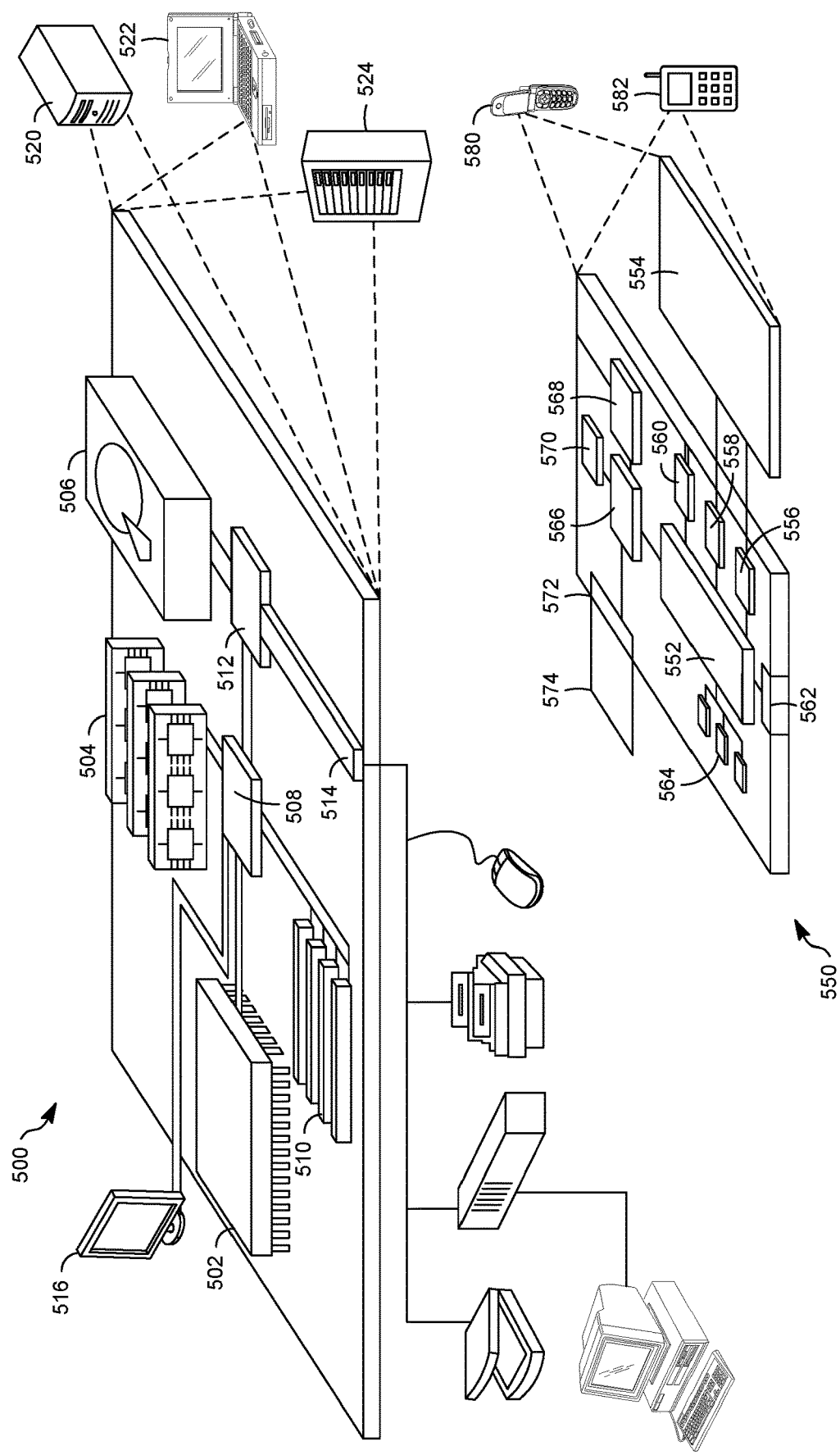
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method comprising:
   determining, based on location and application usage histories associated with a mobile device, one or more usage patterns for applications that are accessible from the mobile device;
   determining a location of the mobile device;
   identifying, from the one or more usage patterns, a subset of applications from the applications that are accessible from the mobile device, wherein previous usage of each application from the subset of applications corresponds to at least one of the one or more usage patterns that is associated with the location of the mobile device;
   responsive to identifying the subset of applications, outputting, by the mobile device, for display, a graphical user interface including a portion for providing suggested applications for the location of the mobile device, the portion for providing suggested applications including a respective graphical element for each application in the subset of applications; and
   executing, by the mobile device, responsive to a user selection of a respective graphical element for a particular application in the subset, the particular application.

2. The method of claim 1, wherein the location of the mobile device is a current location of the mobile device.

3. The method of claim 1, wherein the location of the mobile device is a future location of the mobile device.

4. The method of claim 1, wherein identifying the subset of applications comprises:

receiving, by the mobile device, from a remote computing system, information indicating the subset of applications.

5. The method of claim 4, wherein receiving the information indicating the subset of applications comprises receiving the information indicating the subset of applications in response to sending, by the mobile device, to the remote computing system, the location of the mobile device.

6. The method of claim 1, wherein identifying the subset of applications comprises:
determining, by the mobile device, based on the location and application usage histories of the mobile device, at least one application from the applications that are accessible from the mobile device that was previously accessed from the mobile device while at the location of the mobile device, wherein the subset of applications includes the at least one application.

7. The method of claim 1, wherein identifying the subset of applications comprises:
identifying, by the mobile device and using a prediction model that determines correlations between the location and the application usage histories associated with the mobile device, the subset of applications.

8. The method of claim 7, wherein the prediction model executes at the mobile device.

9. The method of claim 7, wherein the prediction model executes at a remote computing system that is accessed by the mobile device.

10. The method of claim 1, further comprising:
determining current application usage of the mobile device, wherein identifying the subset of applications comprises identifying, based further on the current application usage, the subset of applications.

11. A mobile device comprising:
an output component;
an input component; and
at least one processor configured to:
determine a location of the mobile device;
identify, from one or more usage patterns for applications that are accessible from the mobile device, a subset of applications from the applications that are accessible from the mobile device, wherein previous usage of each application from the subset of applications corresponds to at least one of the one or more usage patterns that is associated with the location of the mobile device, and wherein the one or more usage patterns are determined based on location and application usage histories associated with the mobile device;
responsive to identifying the subset of applications, output, for display at the output component, a graphical user interface including a portion for providing suggested applications for the location of the mobile device, the portion for providing suggested applications including a respective graphical element for each application in the subset of applications;
receive information from the input component about a user selection of a respective graphical element for a particular application in the subset of applications; and
responsive to receiving the information, execute the particular application.

12. The mobile device of claim 11, wherein the location of the mobile device is a current location of the mobile device.

13. The mobile device of claim 11, wherein the location of the mobile device is a future location of the mobile device.

14. The mobile device of claim 11, wherein the at least one processor is configured to identify the subset of applications by at least:
receiving, from a remote computing system, information indicating the subset of applications.

15. The mobile device of claim 14, wherein the at least one processor is configured to receive the information indicating the subset of applications by at least receiving the information indicating the subset of applications in response to sending, to the remote computing system, the location of the mobile device.

16. A non-transitory computer-readable storage medium comprising instructions that, when executed, cause at least one processor of a mobile device to:
determine a location of the mobile device;
determine, based on location and application usage histories associated with the mobile device, one or more usage patterns for applications that are accessible from the mobile device;
identify, from the one or more usage patterns, a subset of applications from the applications that are accessible from the mobile device, wherein previous usage of each application from the subset of applications corresponds to at least one of the one or more usage patterns that is associated with the location of the mobile device;
responsive to identifying the subset of applications, output, for display, a graphical user interface including a portion for providing suggested applications for the location of the mobile device, the portion for providing suggested applications including a respective graphical element for each application in the subset of applications;
receive information about a user selection of a respective graphical element for a particular application in the subset of applications; and
responsive to receiving the information, execute the particular application.

17. The non-transitory computer-readable storage medium of claim 16, wherein the location of the mobile device is a current location of the mobile device.

18. The non-transitory computer-readable storage medium 16, wherein the location of the mobile device is a future location of the mobile device.

19. The non-transitory computer-readable storage medium 16, wherein the instructions, when executed, cause the at least one processor to identify the subset of applications by at least:
receiving, from a remote computing system, information indicating the subset of applications.

20. The non-transitory computer-readable storage medium 19, wherein the instructions, when executed, cause the at least one processor to receive the information indicating the subset of applications by at least receiving the information indicating the subset of applications in response to sending, to the remote computing system, the location of the mobile device.

* * * * *